United States Patent
Zhang et al.

(10) Patent No.: US 10,669,189 B2
(45) Date of Patent: Jun. 2, 2020

(54) HIGH PERFORMANCE GLASS FIBER COMPOSITION, AND GLASS FIBER AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN); Xiucheng Hong, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 5 days.

(21) Appl. No.: 16/084,618

(22) PCT Filed: Mar. 21, 2016

(86) PCT No.: PCT/CN2016/076886
§ 371 (c)(1),
(2) Date: Sep. 13, 2018

(87) PCT Pub. No.: WO2016/165532
PCT Pub. Date: Oct. 20, 2016

(65) Prior Publication Data
US 2019/0100453 A1   Apr. 4, 2019

(30) Foreign Application Priority Data
Mar. 15, 2016 (CN) .......................... 2016 1 0145901

(51) Int. Cl.
C03C 13/00 (2006.01)
C03C 3/095 (2006.01)
C03C 3/087 (2006.01)

(52) U.S. Cl.
CPC .............. *C03C 13/00* (2013.01); *C03C 3/087* (2013.01); *C03C 3/095* (2013.01); *C03C 2213/00* (2013.01)

(58) Field of Classification Search
CPC .......... C03C 3/087; C03C 3/095; C03C 13/00
See application file for complete search history.

(56) References Cited

U.S. PATENT DOCUMENTS

| | | | | |
|---|---|---|---|---|
| 2007/0112123 A1* | 5/2007 | Sekine | .................... | C03C 3/087 524/494 |
| 2013/0143459 A1 | 6/2013 | Li et al. | | |
| 2013/0217807 A1* | 8/2013 | McGinnis | ............... | C03C 3/062 523/458 |
| 2015/0018194 A1* | 1/2015 | Li | .......................... | C03C 13/00 501/38 |
| 2016/0068428 A1* | 3/2016 | Li | .......................... | C03C 13/00 501/38 |

FOREIGN PATENT DOCUMENTS

| | | |
|---|---|---|
| CN | 1340034 A | 3/2002 |
| CN | 103086605 A | 5/2013 |
| CN | 103221354 A | 7/2013 |
| CN | 104343887 A | 2/2015 |
| CN | 104743888 A | 7/2015 |
| CN | 105392744 A | 3/2016 |
| EP | 2380857 A1 | 10/2011 |
| WO | 2011131761 A1 | 10/2011 |
| WO | WO-2011131761 A1 * | 10/2011 ............. C03C 13/00 |

OTHER PUBLICATIONS

The World Intellectual Property Organization (WIPO) International Search Report for PCT/CN2016/076886 dated Dec. 9, 2016 6 Pages.

* cited by examiner

*Primary Examiner* — Elizabeth A. Bolden
(74) *Attorney, Agent, or Firm* — Anova Law Group, PLLC

(57) ABSTRACT

Provided are a high-performance glass fiber composition, and a glass fiber and composite material thereof. The content, given in weight percentage, of each component of the glass fibre composition is as follows: 52-64% of $SiO_2$, 12-24% of $Al_2O_3$, 0.05-8% of $Y_2O_3+La_2O_3+Gd_2O_3$, less than 2.5% of $Li_2O+Na_2O+K_2O$, more than 1% of $K_2O$, 10-24% of CaO+MgO+SrO, 2-14% of CaO, less than 13% of MgO, less than 2% of $TiO_2$, and less than 1.5% of $Fe_2O_3$. The composition significantly increases the mechanical strength and the elastic modulus of glass, significantly reduces the liquidus temperature and the forming temperature of glass, and under equal conditions, significantly reduces the crystallization rate, the surface tension and the bubble rate of glass. The composition is particularly suitable for the tank furnace production of a high-strength high-modulus glass fiber having a low bubble rate.

20 Claims, No Drawings

HIGH PERFORMANCE GLASS FIBER COMPOSITION, AND GLASS FIBER AND COMPOSITE MATERIAL THEREOF

CROSS-REFERENCE TO RELATED APPLICATIONS

This application is a national stage entry under 35 U.S.C. § 371 of International Application No. PCT/CN2016/076886, filed on Mar. 21, 2016, which claims priority to Chinese Patent Application No. 201610145901.9, filed on Mar. 15, 2016, entitled "HIGH PERFORMANCE GLASS FIBER COMPOSITION, AND GLASS FIBER AND COMPOSITE MATERIAL THEREOF", the entire contents of both of which are incorporated by reference herein.

TECHNICAL FIELD OF THE PRESENT INVENTION

The present invention relates to a high-performance glass fiber composition, and in particular to a high-performance glass fiber composition that can be used as reinforcement material for advanced composite material, and glass fiber and composite material made thereof.

BACKGROUND OF THE PRESENT INVENTION

Glass fiber is an inorganic fiber material. Composite material with excellent performance can be obtained by reinforcing resin with glass fiber. As a reinforcing base material for advanced composite material, high-performance glass fibers were initially applied in defense and military fields, for example, the aerospace industry and weapons. With the advances in technology and the development of economy, high-performance glass fiber has been widely applied in fields of ordinary industry and civil affairs, for example, wind turbine blades, high-pressure containers, marine pipelines and automobile production.

The dominant component of the earliest high-performance glass is $MgO$—$Al_2O_3$—$SiO_2$. The typical example is S-2 glass developed by Owens Corning company in U.S.A., which has a modulus of 89-90 GPa. However, the production of S-2 glass is difficult. The glass fiber forming temperature is as high as 1571° C., and the liquidus temperature is as high as 1470° C. It is difficult to realize large-scale tank furnace production. Therefore, the OC company gave up the production of S-2 glass fiber and assigned this patent right to AGY company in U.S.A.

Later, OC company further developed HiPer-tex glass having a modulus of 87-89 GPa. This is a tradeoff to reduce the production difficulty at the cost of certain glass performance. However, since this design only involves improvement to the S-2 glass, both forming temperature and the liquidus temperature of the glass fiber are still high and the production is still difficult. It is still difficult to realize large-scale tank furnace production. Therefore, OC company gave up the production of HiPer-tex glass fiber and assigned this patent right to 3B company in Europe.

Saint-Gobain company in France developed R glass containing $MgO$—$CaO$—$Al_2O_3$—$SiO_2$ as the dominant component, having a modulus of 86-89 GPa. The conventional R glass has a high total content of Si and Al, there is no effective solution available to improve the crystallization performance of glass, and the ratio of Si to Mg is irrational. Consequently, the glass forming is difficult and the risk of crystallization is high. Meanwhile, the surface tension of the molten glass is high and it is very difficult for clarification. The glass fiber forming temperature reaches 1410° C. and the liquidus temperature reaches 1350° C. All of these lead to difficulty in the efficient drawing of glass fiber. It is still difficult to realize large-scale tank furnace production.

In China, Nanjing Fiberglass Research & Design Institute developed HS2 glass having a modulus of 84-87 GPa and containing $SiO_2$, $Al_2O_3$ and MgO as the dominant components as well as $Li_2O$, $B_2O_3$, $CeO_2$ and $Fe_2O_3$. The forming temperature is only 1245° C. and the liquidus temperature is 1320° C., which are much lower than those for S glass. However, the forming temperature is lower than the liquidus temperature. The difference in temperature is denoted by $\Delta T$, the value of which is negative. This is quite disadvantageous for the efficient drawing of glass fiber. It is necessary to increase the forming temperature and use special bushing tips to avoid the devitrification of glass during the drawing process. This leads to the difficulty in temperature control. It is still difficult to realize large-scale tank furnace production.

In conclusion, it has been found that at present various kinds of high-performance glass fiber generally have difficulties in tank furnace production, specifically manifested in high liquidus temperature, high crystallization rate, high forming temperature, high surface tension, high difficulty in clarification, and low or even negative value of $\Delta T$. Because of this, in most companies, the production difficulty is reduced at the cost of certain glass performance. As a result, the performance of such high-performance glass fiber cannot be improved as the scale of production increases.

SUMMARY OF THE PRESENT INVENTION

The present invention aims to solve the problems described above. An objective of the present invention is to provide a high-performance glass fiber composition that can significantly increase the mechanical strength and elastic modulus of glass, and on this basis, can overcome problems of the conventional high-performance glass, i.e., high risk of crystallization, high surface tension, high difficulty in clarification, and difficulty in efficient tank furnace production, significantly reduce the liquidus temperature and the forming temperature of glass, and under equal conditions, significantly reduce the crystallization rate, the surface tension and the bubble rate of glass. The composition is particularly suitable for the tank furnace production of high-strength high-modulus glass fiber having a low bubble rate.

According to one aspect of the present invention, the present invention provides a high-performance glass fiber composition, containing the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $CaO + MgO + SrO$ | 10-24% |
| $CaO$ | 2-14% |
| $MgO$ | <13% |
| $TiO_2$ | <2% |
| $Fe_2O_3$ | <1.5% |

Wherein, it is further defined that a ratio C1 in weight percentage of $K_2O$ to $R_2O$, $C1=K_2O/R_2O$, is greater than 0.44.

Wherein, it is further defined that a ratio C2 in weight percentage of ($MgO+SrO$) to CaO, $C2=(MgO+SrO)/CaO$, is greater than 0.9.

Wherein, it is further defined that the content of $Li_2O$ in weight percentage is 0.1-1%.

Wherein, it is further defined that the content of $Y_2O_3$ in weight percentage is 0.05-6%.

Wherein, it is further defined that the content of $La_2O_3$ in weight percentage is 0.05-2%.

Wherein, it is further defined that the content of SrO in weight percentage is less than 2.5%.

Wherein, it is further defined that the content of CaO in weight percentage is 4-11%.

Wherein, it is further defined that the content of MgO in weight percentage is 6-12%.

Wherein, it is further defined that a ratio C1 in weight percentage of $K_2O$ to $R_2O$, $C1=K_2O/R_2O$, is greater than or equal to 0.5.

Wherein, it is further defined that a ratio C2 in weight percentage of (MgO+SrO) to CaO, $C2=(MgO+SrO)/CaO$, is greater than or equal to 1.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $Li_2O$ | 0.1-1% |
| CaO + MgO + SrO | 10-24% |
| CaO | 2-14% |
| MgO | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| CaO + MgO + SrO | 10-24% |
| CaO | 2-14% |
| MgO | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $La_2O_3$ | 0.05-2% |
| $R_2O = Li_2O + Na_2O + K_2O$ | <2.5% |
| $K_2O$ | >1% |
| CaO + MgO + SrO | 10-24% |
| CaO | 2-14% |
| MgO | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| CaO + MgO + SrO | 10-24% |
| CaO | 2-14% |
| MgO | <13% |
| SrO | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $Li_2O$ | 0.1-1% |
| CaO + MgO + SrO | 10-24% |
| CaO | 2-14% |
| MgO | <13% |
| SrO | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| $Li_2O$ | 0.1-1% |
| CaO + MgO + SrO | 10-24% |
| CaO | 2-14% |
| MgO | <13% |
| SrO | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Wherein, the content of the components in weight percentage is as follows:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $La_2O_3$ | 0.05-2% |
| $R_2O = Li_2O + Na_2O + K_2O$ | <2.5% |
| $K_2O$ | >1% |
| $Li_2O$ | 0.1-1% |
| CaO + MgO + SrO | 10-24% |

-continued

| | |
|---|---|
| CaO | 2-14% |
| MgO | <13% |
| SrO | <2.5% |
| TiO$_2$ | <2% |
| Fe$_2$O$_3$ | <1.5% | and, a ratio C1 in weight percentage of K$_2$O to R$_2$O, C1=K$_2$O/R$_2$O, is greater than 0.44, and a ratio C2 in weight percentage of (MgO+SrO) to CaO, C2=(MgO+SrO)/CaO, is greater than 0.9.

Wherein, it is further defined that the content of SrO in weight percentage is 0.1-2%.

Wherein, it is further defined that the content of SiO$_2$+Al$_2$O$_3$ in weight percentage is less than 80%.

Wherein, it is further defined that the content of Y$_2$O$_3$ in weight percentage is 0.5-5%.

Wherein, it is further defined that the content of Gd$_2$O$_3$ in weight percentage is 0.05-1%.

Wherein, it is further defined that the content of Y$_2$O$_3$+La$_2$O$_3$+Gd$_2$O$_3$ in weight percentage is 1-6%.

Wherein, it is further defined that a ratio C2 in weight percentage of (MgO+SrO) to CaO, C2=(MgO+SrO)/CaO, is 1.1-1.7.

Wherein, the content of the components in weight percentage is as follows:

| | |
|---|---|
| SiO$_2$ | 52-64% |
| Al$_2$O$_3$ | 12-24% |
| RE$_2$O$_3$ = Y$_2$O$_3$ + La$_2$O$_3$ + Gd$_2$O$_3$ | 1-6% |
| R$_2$O = Li$_2$O + Na$_2$O + K$_2$O | <2.5% |
| K$_2$O | >1% |
| Li$_2$O | 0.1-1% |
| CaO + MgO + SrO | 10-24% |
| CaO | 4-11% |
| MgO | 6-12% |
| SrO | <2.5% |
| TiO$_2$ | <2% |
| Fe$_2$O$_3$ | <1.5% | and, a ratio C1 in weight percentage of K$_2$O to R$_2$O, C1=K$_2$O/R$_2$O, is greater than or equal to 0.5, and a ratio C2 in weight percentage of (MgO+SrO) to CaO, C2=(MgO+SrO)/CaO, is greater than or equal to 1.

Wherein, the content of the components in weight percentage is as follows:

| | |
|---|---|
| SiO$_2$ | 54-62% |
| Al$_2$O$_3$ | 13-21% |
| RE$_2$O$_3$ = Y$_2$O$_3$ + La$_2$O$_3$ + Gd$_2$O$_3$ | 1-6% |
| Y$_2$O$_3$ | 0.5-5% |
| R$_2$O = Li$_2$O + Na$_2$O + K$_2$O | <2.3% |
| K$_2$O | >1% |
| Li$_2$O | 0.1-1% |
| CaO + MgO + SrO | 10-24% |
| CaO | 4-11% |
| MgO | 6-12% |
| SrO | <2.5% |
| TiO$_2$ | <2% |
| Fe$_2$O$_3$ | <1.5% | and, a ratio C1 in weight percentage of K$_2$O to R$_2$O, C1=K$_2$O/R$_2$O, is greater than or equal to 0.5, and a ratio C2 in weight percentage of (MgO+SrO) to CaO, C2=(MgO+SrO)/CaO, is 1.1-1.7.

Wherein, the high-performance glass fiber composite further contains CeO$_2$, the content of which in weight percentage is 0-1%.

According to another aspect of the present invention, the present invention provides glass fiber made of the glass fiber composition described above.

According to a third aspect of the present invention, the present invention provides composite material comprising the glass fiber described above.

With regard to the high-performance glass fiber composition of the present invention, as the main innovations, an alkali metal oxide K$_2$O in a high content is introduced, together with rare earth oxides Y$_2$O$_3$, La$_2$O$_3$ and Gd$_2$O$_3$, to control the ratio of K$_2$O to R$_2$O and the ratio of (MgO+SrO) to CaO; the content of K$_2$O, Li$_2$O, Na$_2$O, Y$_2$O$_3$, La$_2$O$_3$, Gd$_2$O$_3$, SrO, CaO, MgO, and CaO+MgO+SrO is rationally configured; and the mixed alkali effect of K$_2$O, Na$_2$O and Li$_2$O and the mixed alkaline earth effect of CaO, MgO and SrO are utilized. Additionally, a proper amount of CeO$_2$ or the like may be selectively introduced.

Specifically, the high-performance glass fiber composition of the present invention contains the following contents of components in weight percentage:

| | |
|---|---|
| SiO$_2$ | 52-64% |
| Al$_2$O$_3$ | 12-24% |
| RE$_2$O$_3$ = Y$_2$O$_3$ + La$_2$O$_3$ + Gd$_2$O$_3$ | 0.05-8% |
| R$_2$O = Li$_2$O + Na$_2$O + K$_2$O | <2.5% |
| K$_2$O | >1% |
| CaO + MgO + SrO | 10-24% |
| CaO | 2-14% |
| MgO | <13% |
| TiO$_2$ | <2% |
| Fe$_2$O$_3$ | <1.5% |

The function and content of components in the glass fiber composition will be described below.

SiO$_2$ is a major oxide for forming the glass network and plays a role of stabilizing all the components. In the glass fiber composition of the present invention, it is defined that the content of SiO$_2$ in weight percentage is 52-64%. Preferably, it may be defined that the content of SiO$_2$ in weight percentage is 54-62%.

Al$_2$O$_3$ is also an oxide for forming the glass network and plays a substantive role in the mechanical properties of glass in combination with SiO$_2$. If the content of Al$_2$O$_3$ is too low, the glass is unable to obtain high enough mechanical properties; and if the content of Al$_2$O$_3$ is too high, both the viscosity and the surface tension of glass will be too high, and as a result, it is difficult to melt and clarify the glass. In the glass fiber composition of the present invention, it is defined that the content of Al$_2$O$_3$ in weight percentage is 12-24%. Preferably, it may be defined that the content of Al$_2$O$_3$ in weight percentage is 13-21%. Additionally, further, it may be defined that the content of SiO$_2$+Al$_2$O$_3$ in weight percentage is less than 80%.

Both K$_2$O and Na$_2$O can decrease the viscosity of glass and they are good flux. It has been found that, in a case where the content of the alkali metal oxide is high, replacing K$_2$O with Na$_2$O can reduce the crystallization tendency of glass and improve the fiber forming performance, and can significantly reduce the surface tension of the molten glass and effectively improve the clarification effect of the glass, and can also increase the mechanical strength of the glass. Particularly when the content of K$_2$O in weight percentage is greater than 1%, unexpected results are obtained. Compared with Na$_2$O and K$_2$O, Li$_2$O can not only significantly reduce the viscosity of glass thus to improve the melting performance of the glass, but also can be very helpful for the mechanical properties of glass. Meanwhile, a considerable amount of free oxygen can be provided by a small amount of $Li_2O$. This facilitates the formation of the tetrahedral coordination structure by more Al ions, enhances the network structure of the glass system, and further reduces the crystallization possibility of glass. However, the content of $Li_2O$ should not be too high, because too many $Li^+$ ions will show an obvious network breakage effect, which will impair the stability of the glass structure and accelerate the crystallization of glass. Therefore, in the glass fiber composition of the present invention, it is defined that the content of $Na_2O+K_2O+Li_2O$ in weight percentage is less than 2.5%. Preferably, it may be defined that the content of $Na_2O+K_2O+Li_2O$ in weight percentage is less than 2.3%. Meanwhile, it is defined that the content of $K_2O$ in weight percentage is greater than 1%. Further, it may be defined that the content of $Li_2O$ in weight percentage is 0.1-1%. Further, it may be defined that a ratio C1 in weight percentage of $K_2O$ to $R_2O$, $C1=K_2O/R_2O$, is greater than 0.44. Preferably, it may be defined that a ratio C1 in weight percentage of $K_2O$ to $R_2O$, $C1=K_2O/R_2O$, is greater than or equal to 0.5.

It has been found that, in a case where the content of the alkali metal oxide is high, one or more of rare earth oxides $Y_2O_3$, $La_2O_3$ and $Gd_2O_3$ are introduced. Due to the strong anion accumulation effect of rare earth oxides, the surplus free oxygen is captured to fill vacancies in the glass structure, to further enhance the stability and compactness of the glass structure, in order to improve the mechanical properties of the glass. Meanwhile, the rare earth oxides can effectively prevent the migration of other ions, in order to reduce the crystallization tendency of the glass. It has also been found that the use of two or more of the rare earth oxides, with the ratio of which being controlled at a proper value, has significant synergistic effect and has better effects in improving the mechanical properties of the glass and suppressing the crystallization of the glass than the use of a single rear earth oxide. Unexpected results are obtained. On the one hand, the use of several rare earth oxides can provide abundant ion coordination structures outside the network, which facilitates the stability of the glass structure and improves the mechanical properties of the glass; and on the other hand, when the temperature drops, the probability for regular arrangement of several kinds of rear earth ions with different radii is reduced, which facilitates the significant reduction in the growth rate of crystals and thus further enhances the resistance against the crystallization of the glass. In the glass fiber composition of the present invention, it is defined that the content of $RE_2O_3=Y_2O_3+La_2O_3+Gd_2O_3$ in weight percentage is 0.05-8%. Preferably, it may be defined that the content of $RE_2O_3=Y_2O_3+La_2O_3+Gd_2O_3$ in weight percentage is 1-6%. Further, it may be defined that the content of $Y_2O_3$ in weight percentage is 0.05-6%. Preferably, it may be defined that the content of $Y_2O_3$ in weight percentage is 0.5-5%. Further, it may be defined that the content of $La_2O_3$ in weight percentage is 0.05-2%. Further, it may be defined that the content of $Gd_2O_3$ in weight percentage is 0.05-1%.

CaO, MgO and SrO play a role of controlling the crystallization of the glass and adjusting the viscosity of the glass. Particularly in the aspect of controlling the crystallization of the glass, unexpected results are obtained by controlling their usage amount and their proportion. Generally, for the high-performance glass containing MgO—CaO—$Al_2O_3$—$SiO_2$ as the dominant components, the crystalline phases resulted by the crystallization of the glass mainly include diopside ($CaMgSi_2O_6$) and anorthite ($CaAl_2Si_2O_8$). In order to effectively suppress the crystallization tendency of the two crystalline phases and to reduce the liquidus temperature and the crystallization rate of glass, in the present invention, by properly controlling the content of CaO+MgO+SrO and the ratio of the components $C2=(MgO+SrO)/CaO$, a more compact accumulated structure is formed by the mixed alkaline earth effect so that much energy is required by the formation and growth of the crystal nucleus. In this way, the crystallization tendency of the glass is suppressed. Furthermore, the introduction of a proper amount of SrO makes the formed glass structure more stable, which is good for the further improvement of the performance of the glass. In the glass fiber composition of the present invention, it is defined that the content of CaO+MgO+SrO in weight percentage is 10-24%. As an important oxide outside the network, a too high content of CaO will increase the crystallization tendency of glass, resulting in a risk of separating out anorthite, wollastonite or other crystals. In the glass fiber composition of the present invention, it is defined that the content of CaO in weight percentage is 2-14%. Preferably, it may be defined that the content of CaO in weight percentage is 4-11%. MgO plays a role similar to CaO in glass, but the field strength of $Mg^{2+}$ is higher. It plays an important role in increasing the modulus of glass. In the glass fiber composition of the present invention, it is defined that the content of MgO in weight percentage is less than 13%. Preferably, it may be defined that the content of MgO in weight percentage is 6-12%. Further, it may be defined that the content of SrO in weight percentage is less than 2.5%. Preferably, it may be defined that the content of SrO in weight percentage is 0.1-2%. Further, it may be defined that a ratio C2 in weight percentage of (MgO+SrO) to CaO, $C2=(MgO+SrO)/CaO$, is greater than 0.9. Preferably, it may be defined that the ratio C2 is greater than or equal to 1. More preferably, it may be defined that the ratio C2 is 1.1-1.7.

$TiO_2$ can not only decrease the viscosity of glass at high temperatures, but also play a certain role of flux. However, titanium ions have a certain role of coloring, and especially when the content of $TiO_2$ exceeds 2%, the coloring effect becomes significant and will affect the appearance of the glass fiber products. Therefore, in the glass fiber composition of the present invention, it is defined that the content of $TiO_2$ in weight percentage is less than 2%.

$Fe_2O_3$ facilitates the melting of the glass, and can also improve the crystallization performance of glass. However, since ferric ions and ferrous ions have a role of coloring, their usage amounts should not be high. Therefore, in the glass fiber composition of the present invention, it is defined that the content of $Fe_2O_3$ in weight percentage is less than 1.5%.

In the glass fiber composition of the present invention, a proper amount of $CeO_2$ may be selectively introduced to further improve the crystallization tendency and the clarification effect of the glass. In the glass fiber composition of the present invention, it is defined that the content of $CeO_2$ in weight percentage is 0-1%.

Additionally, it is allowed that the glass fiber composition of the present invention further contains a small amount of other components, the content of which in weight percentage generally does not exceed 2%.

In the glass fiber composition of the present invention, beneficial effects obtained by defining the content of components in the above ranges will be described below by specific experimental data in the embodiments.

Preferred examples of the contents ranges of components in the glass fiber composition of the present invention will be given below. According to the following preferred examples, the elastic modulus of glass fiber formed by the composition is greater than 90 GPa and the single fiber strength is greater than 4,250 MPa.

Preferred Example 1

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Preferred Example 2

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| $CaO + MgO + SrO$ | 10-24% |
| $CaO$ | 2-14% |
| $MgO$ | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Preferred Example 3

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $La_2O_3$ | 0.05-2% |
| $R_2O = Li_2O + Na_2O + K_2O$ | <2.5% |
| $K_2O$ | >1% |
| $CaO + MgO + SrO$ | 10-24% |
| $CaO$ | 2-14% |
| $MgO$ | <13% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Preferred Example 4

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44.

Preferred Example 5

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 6

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 7

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $La_2O_3$ | 0.05-2% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 8

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | 0.1-2% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 9

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.5-5% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 10

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $Gd_2O_3$ | 0.05-1% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% |
| $CeO_2$ | 0-1% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is greater than 0.9.

Preferred Example 11

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $Y_2O_3$ | 0.05-6% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 2-14% |
| $MgO$ | <13% |
| $SrO$ | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than 0.44, and a ratio C2 in weight percentage of (MgO+SrO) to CaO, $C2=(MgO+SrO)/CaO$, is 1.1-1.7.

Preferred Example 12

The high-performance glass fiber composition of the present invention contains the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 1-6% |
| $R_2O = Li_2O + Na_2O + K_2O$ | <2.5% |
| $K_2O$ | >1% |
| $Li_2O$ | 0.1-1% |
| $CaO + MgO + SrO$ | 10-24% |
| $CaO$ | 4-11% |
| $MgO$ | 6-12% |
| $SrO$ | 0.1-2% |
| $TiO_2$ | <2% |
| $Fe_2O_3$ | <1.5% | and, a ratio C1 in weight percentage of $K_2O$ to $R_2O$, $C1=K_2O/R_2O$, is greater than or equal to 0.5, and a ratio C2 in weight percentage of (MgO+SrO) to CaO, $C2=(MgO+SrO)/CaO$, is greater than or equal to 1.

Preferred Example 13

The high-performance glass fiber composition of the present invention contains the following contents of components in weight percentage:

| | |
|---|---|
| $SiO_2$ | 54-62% |
| $Al_2O_3$ | 13-21% |
| $SiO_2 + Al_2O_3$ | <80% |
| $RE_2O_3 = Y_2O_3 + La_2O_3 + Gd_2O_3$ | 1-6% |
| $Y_2O_3$ | 0.5-5% |
| $R_2O = Li_2O + Na_2O + K_2O$ | <2.3% |
| $K_2O$ | >1% |
| $Li_2O$ | 0.1-1% |
| CaO + MgO + SrO | 10-24% |
| CaO | 4-11% |
| MgO | 6-12% |
| SrO | <2.5% |
| $TiO_2$ | <2% |
| $Fe_2O_3$ | <1.5% | and, a ratio C1 in weight percentage of $K_2O$ to $R_2O$, $C1=K_2O/R_2O$, is greater than or equal to 0.5, and a ratio C2 in weight percentage of (MgO+SrO) to CaO, $C2=(MgO+SrO)/CaO$, is 1.1-1.7.

DETAILED DESCRIPTION OF THE PRESENT INVENTION

In order to make the objectives, technical solutions and advantages of the embodiments of the present invention clearer, the technical solutions in the embodiments of the present invention will be described clearly and completely. Apparently, the described embodiments are just some of but not all of the embodiments of the present invention. All other embodiments obtained by a person of ordinary skill in the art without paying ant creative effort on the basis of the embodiments in the present invention shall fall into the protection scope of the present invention. It is to be noted that the embodiments in the present application and the features in the embodiments can be combined at will if not conflicted.

The basic idea of the present invention is that the glass fiber composition contains the following contents of components in weight percentage: 52-64% of $SiO_2$, 12-24% of $Al_2O_3$, 0.05-8% of $Y_2O_3+La_2O_3+Gd_2O_3$, less than 2.5% of $Li_2O+Na_2O+K_2O$, more than 1% of $K_2O$, 10- 24% of CaO+MgO+SrO, 2-14% of CaO, less than 13% of MgO, less than 2% of $TiO_2$, and less than 1.5% of $Fe_2O_3$. The composition can greatly increase the mechanical strength and elastic modulus of glass, and can also significantly reduce the liquidus temperature and the forming temperature of glass, and under equal conditions, can greatly reduce the crystallization rate, the surface tension and the bubble rate of glass. The composition is particularly suitable for the tank furnace production of high-strength high-modulus glass fiber having a low bubble rate.

Specific values of contents of $SiO_2$, $Al_2O_3$, $Y_2O_3$, $La_2O_3$, $Gd_2O_3$, CaO, MgO, $Li_2O$, $Na_2O$, $K_2O$, $Fe_2O_3$, $TiO_2$ and SrO in the glass fiber composition of the present invention are selected as embodiments for comparing with performance parameters of S glass, conventional R glass and improved R glass. Six performance parameters are used for the performance comparison:

(1) forming temperature, which corresponds to the temperature of molten glass at a viscosity of $10^3$ P;

(2) liquidus temperature, which corresponds to the temperature at which crystal nucleuses begin to form when molten glass is cooled, i.e., the ceiling temperature of the crystallization of glass;

(3) ΔT, which is the difference between the forming temperature and the liquidus temperature and represents the range of the temperature for fiber formation;

(4) crystallization peak temperature, which corresponds to the temperature at the highest peak of the crystallization of glass during the DTA testing; in general cases, a higher temperature means more energy is required for the growth of crystal nucleuses and low crystallization tendency of glass;

(5) elastic modulus, which is longitudinal elastic modulus, represents the resistance of the glass against the elastic deformation, and is tested in accordance with ASTM2343;

(6) filament strength, the maximum tensile strength that a single fiber can withstand;

(7) amount of bubbles, wherein the general method for measuring the amount of bubbles is as follows: Use specific moulds to compress the glass batch materials in each example into samples of same dimension, which will then be placed on the sample platform of a high temperature microscope. Heat the samples according to standard procedures up to the pre-set spatial temperature 1500° C. and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

The seven parameters and their measurement methods are well known to those skilled in the art, and therefore the performance of the glass fiber composition of the present invention can be represented effectively by the parameters.

The specific process of experiments is as follows: components can be selected from suitable raw materials, various raw materials are mixed in proportion to achieve the final desired weight percentage, and the mixed batches are melted and clarified; then, the molten glass is drawn out through the bushing tips on a bushing to form glass fiber, and the glass fiber is wound onto a rotary collet of a winding machine to form cakes or packages. Of course, such glass fiber can be further processed in a conventional manner to satisfy the expected requirements.

Specific embodiments of the glass fiber composition of the present invention will be given below.

| Embodiment 1 | |
|---|---|
| $SiO_2$ | 58.6% |
| $Al_2O_3$ | 16.9% |
| CaO | 7.3% |
| MgO | 9.9% |
| $Y_2O_3$ | 3.9% |
| $La_2O_3$ | 0.3% |
| $Na_2O$ | 0.23% |
| $K_2O$ | 1.05% |
| $Li_2O$ | 0.50% |
| $Fe_2O_3$ | 0.44% |
| $TiO_2$ | 0.63% | and, a ratio C1 in weight percentage of $K_2O$ to $R_2O$, $C1=K_2O/R_2O$, is 0.59, and a ratio C2 in weight percentage of (MgO+SrO) to CaO, $C2=(MgO+SrO)/CaO$, is 1.36.

Values of six parameters measured in Embodiment 1 are respectively:

| | |
|---|---|
| forming temperature | 1298° C. |
| liquidus temperature | 1206° C. |
| ΔT | 92° C. |
| crystallization peak temperature | 1033° C. |
| elastic modulus | 96.0 GPa |
| filament strength | 4290 MPa |
| amount of bubbles | 3 |

Embodiment 2

| | |
|---|---|
| $SiO_2$ | 58.6% |
| $Al_2O_3$ | 16.9% |
| CaO | 6.8% |
| MgO | 9.6% |
| $Y_2O_3$ | 3.9% |
| $La_2O_3$ | 0.3% |
| $Na_2O$ | 0.23% |
| $K_2O$ | 1.05% |
| $Li_2O$ | 0.50% |
| $Fe_2O_3$ | 0.44% |
| $TiO_2$ | 0.63% |
| SrO | 0.8% | and, a ratio C1 in weight percentage of $K_2O$ to $R_2O$, C1=$K_2O/R_2O$, is 0.59, and a ratio C2 in weight percentage of (MgO+SrO) to CaO, C2=(MgO+SrO)/CaO, is 1.53.

Values of six parameters measured in Embodiment 2 are respectively:

| | |
|---|---|
| forming temperature | 1300° C. |
| liquidus temperature | 1205° C. |
| ΔT | 95° C. |
| crystallization peak temperature | 1034° C. |
| elastic modulus | 96.8 GPa |
| filament strength | 4305 MPa |
| amount of bubbles | 4 |

Embodiment 3

| | |
|---|---|
| $SiO_2$ | 58.6% |
| $Al_2O_3$ | 16.9% |
| CaO | 7.2% |
| MgO | 9.9% |
| $Y_2O_3$ | 3.9% |
| $La_2O_3$ | 0.3% |
| $Na_2O$ | 0.18% |
| $K_2O$ | 1.30% |
| $Li_2O$ | 0.50% |
| $Fe_2O_3$ | 0.44% |
| $TiO_2$ | 0.53% | and, a ratio C1 in weight percentage of $K_2O$ to $R_2O$, C1=$K_2O/R_2O$, is 0.67, and a ratio C2 in weight percentage of (MgO+SrO) to CaO, C2=(MgO+SrO)/CaO, is 1.38.

Values of six parameters measured in Embodiment 3 are respectively:

| | |
|---|---|
| forming temperature | 1297° C. |
| liquidus temperature | 1205° C. |
| ΔT | 92° C. |
| crystallization peak temperature | 1033° C. |
| elastic modulus | 96.5 GPa |
| filament strength | 4330 MPa |
| amount of bubbles | 2 |

Embodiment 4

| | |
|---|---|
| $SiO_2$ | 59.2% |
| $Al_2O_3$ | 16.9% |
| CaO | 7.6% |
| MgO | 9.8% |
| $Y_2O_3$ | 2.9% |
| $Na_2O$ | 0.21% |
| $K_2O$ | 1.03% |
| $Li_2O$ | 0.40% |
| $Fe_2O_3$ | 0.44% |
| $TiO_2$ | 0.41% |
| SrO | 0.8% | and, a ratio C1 in weight percentage of $K_2O$ to $R_2O$, C1=$K_2O/R_2O$, is 0.63, and a ratio C2 in weight percentage of (MgO+SrO) to CaO, C2=(MgO+SrO)/CaO, is 1.29.

Values of six parameters measured in Embodiment 4 are respectively:

| | |
|---|---|
| forming temperature | 1293° C. |
| liquidus temperature | 1199° C. |
| ΔT | 94° C. |
| crystallization peak temperature | 1031° C. |
| elastic modulus | 95.3 GPa |
| filament strength | 4295 MPa |
| amount of bubbles | 3 |

The comparison of the above embodiments and other embodiments of the glass fiber composition of the present invention with performance parameters of S glass, conventional R glass and improved R glass will be further given below by tables, where the content of the glass fiber composition is represented in weight percentage. It is to be noted that the total content of the components in the embodiments is slightly less than 100%, and it can be understood that the remaining is a trace amount of impurities or a small amount of components which cannot be analyzed.

TABLE 1A

| | | A1 | A2 | A3 | A4 | A5 | A6 | A7 |
|---|---|---|---|---|---|---|---|---|
| Components | $SiO_2$ | 59.2 | 59.3 | 59.5 | 58.4 | 58.0 | 58.8 | 58.6 |
| | $Al_2O_3$ | 16.9 | 16.8 | 17.5 | 17.8 | 19.1 | 17.0 | 16.9 |
| | CaO | 7.6 | 6.9 | 8.9 | 9.1 | 6.9 | 5.7 | 7.2 |
| | MgO | 9.8 | 11.1 | 9.8 | 10.1 | 9.0 | 10.5 | 9.9 |
| | $Y_2O_3$ | 2.9 | 3.0 | — | — | 3.5 | 5.0 | 3.9 |
| | $La_2O_3$ | — | 0.3 | 1.1 | — | 0.4 | — | 0.3 |
| | $Gd_2O_3$ | — | — | — | 0.4 | — | — | — |
| | $Na_2O$ | 0.21 | 0.21 | 0.23 | 0.23 | 0.13 | 0.27 | 0.18 |
| | $K_2O$ | 1.03 | 1.05 | 1.02 | 1.08 | 1.10 | 1.08 | 1.30 |
| | $Li_2O$ | 0.40 | 0.20 | 0.30 | 0.60 | 0.41 | 0.51 | 0.45 |
| | $Fe_2O_3$ | 0.44 | 0.44 | 0.44 | 0.44 | 0.44 | 0.43 | 0.44 |
| | $TiO_2$ | 0.41 | 0.41 | 0.39 | 0.57 | 0.76 | 0.45 | 0.53 |
| | SrO | 0.8 | — | 0.6 | — | — | — | — |

TABLE 1A-continued

|  |  | A1 | A2 | A3 | A4 | A5 | A6 | A7 |
|---|---|---|---|---|---|---|---|---|
| Ratio | C1 | 0.63 | 0.72 | 0.66 | 0.57 | 0.67 | 0.58 | 0.67 |
|  | C2 | 1.29 | 1.61 | 1.10 | 1.11 | 1.30 | 1.84 | 1.38 |
| Parameters | Forming temperature/° C. | 1293 | 1295 | 1297 | 1294 | 1301 | 1301 | 1297 |
|  | Liquidus temperature/° C. | 1199 | 1205 | 1200 | 1203 | 1201 | 1205 | 1205 |
|  | ΔT/° C. | 94 | 90 | 97 | 91 | 100 | 96 | 92 |
|  | Crystallization peak temperature/° C. | 1031 | 1028 | 1032 | 1030 | 1031 | 1035 | 1033 |
|  | Elastic modulus/GPa | 95.3 | 96.1 | 93.9 | 93.5 | 96.8 | 98.6 | 96.5 |
|  | Filament strength/MPa | 4295 | 4305 | 4270 | 4260 | 4315 | 4350 | 4330 |
|  | Amount of bubbles | 3 | 4 | 4 | 4 | 3 | 3 | 2 |

TABLE 1B

|  |  | A8 | A9 | A10 | A11 | S glass | Conventional R glass | Improved R glass |
|---|---|---|---|---|---|---|---|---|
| Components | $SiO_2$ | 58.6 | 58.6 | 58.6 | 58.6 | 65 | 60 | 60.75 |
|  | $Al_2O_3$ | 16.9 | 16.9 | 16.9 | 16.9 | 25 | 25 | 15.80 |
|  | CaO | 7.3 | 8.0 | 6.8 | 7.3 | — | 9 | 13.90 |
|  | MgO | 9.9 | 9.2 | 9.6 | 9.9 | 10 | 6 | 7.90 |
|  | $Y_2O_3$ | 3.9 | 3.9 | 3.9 | 3.9 | — | — | — |
|  | $La_2O_3$ | 0.3 | 0.3 | 0.3 | 0.3 | — | — | — |
|  | $Na_2O$ | 0.18 | 0.23 | 0.23 | 0.23 | Trace amount | Trace amount | 0.73 |
|  | $K_2O$ | 1.15 | 1.05 | 1.05 | 1.05 | Trace amount | Trace amount |  |
|  | $Li_2O$ | 0.50 | 0.50 | 0.50 | 0.50 | — | — | 0.48 |
|  | $Fe_2O_3$ | 0.44 | 0.44 | 0.44 | 0.44 | Trace amount | Trace amount | 0.18 |
|  | $TiO_2$ | 0.58 | 0.63 | 0.63 | 0.63 | Trace amount | Trace amount | 0.12 |
|  | SrO | — | — | 0.8 | — | — | — | — |
| Ratio | C1 | 0.63 | 0.59 | 0.59 | 0.59 | — | — | — |
|  | C2 | 1.36 | 1.15 | 1.53 | 1.36 | — | — | — |
| Parameters | Forming temperature/° C. | 1299 | 1230 | 1300 | 1298 | 1571 | 1430 | 1278 |
|  | Liquidus temperature/° C. | 1204 | 1205 | 1205 | 1206 | 1470 | 1350 | 1210 |
|  | ΔT/° C. | 95 | 95 | 95 | 92 | 101 | 80 | 68 |
|  | Crystallization peak temperature/° C. | 1034 | 1034 | 1034 | 1033 | — | 1010 | 1016 |
|  | Elastic modulus/GPa | 96.5 | 95.7 | 96.8 | 96.0 | 89 | 88 | 87 |
|  | Filament strength/MPa | 4320 | 4280 | 4305 | 4290 | — | 4220 | 4109 |
|  | Amount of bubbles | 3 | 3 | 4 | 3 | 40 | 30 | 25 |

It can be known from the above tables that, compared with S glass and conventional R glass, the glass fiber composition of the present invention has the following benefits: (1) the elastic modulus is much higher; (2) the liquidus temperature is much lower, and this is helpful to reduce the risk of crystallization of glass and improve the forming efficiency of fiber; and the crystallization peak temperature is higher, and this means that the formation and growth of crystal nucleuses need more energy during the crystallization of glass, that is, the crystallization rate of the glass of the present invention is lower under equal conditions; (3) the number of bubbles is decreased remarkably, and this means that the clarification effect of glass is significantly improved.

Compared with improved R glass, the glass fiber composition of the present invention has the following benefits: (1) the elastic modulus is much higher; (2) the crystallization peak temperature is higher, and this means that the formation and growth of crystal nucleuses need more energy during the crystallization of glass, that is, the crystallization rate of the glass of the present invention is lower under equal conditions; (3) the filament strength is much higher; (4) the number of bubbles is decreased remarkably, and this means that the clarification effect of glass is significantly improved.

Both S glass and conventional R class cannot realize tank furnace production, and improved R class reduces the liquidus temperature and forming temperature at the cost of certain performance to reduce the production difficulty and realize tank furnace production. In contrast, the composition of the present invention can not only realize tank furnace production with low enough liquidus temperature and lower crystallization rate, but also remarkably improve the modulus of glass. The technical bottleneck that the modulus of S glass and R glass fiber cannot be improved with the increasing production scale is resolved.

Glass fiber having excellent performance can be made from the glass fiber composition of the present invention.

Composite material having excellent performance, for example, glass fiber reinforced base materials, can be manufactured by the combination of the glass fiber composition of the present invention and one or more organic and/or inorganic materials.

Finally, it is to be noted that, as used herein, the term "comprise/comprising", "contain/containing" or any other variants thereof is non-exclusive, so that a process, method, object or device containing a series of elements contains not only these elements, but also other elements not listed clearly, or further contains inherent elements of the process, method, object or device. Without more restrictions, an element defined by the statement "comprises a/an . . . " does not exclude other identical elements in the process, method, object or device including this element.

The foregoing embodiments are merely used for describing the technical solutions of the present invention and not intended to limit the technical solutions of the present invention. Although the present invention has been described in detail by the foregoing embodiments, it should be understood by a person of ordinary skill in the art that modifications still can be made to the technical solutions recorded in the foregoing embodiments or equivalent replacements can be made to part of technical features, and these modifications or replacements will not make the essence of the corresponding technical solutions depart from the spirit and scope of the technical solutions in the embodiments of the present invention.

INDUSTRIAL APPLICABILITY OF THE PRESENT INVENTION

The composition of the present invention can not only realize tank furnace production with low enough liquidus temperature and lower crystallization rate, but also remarkably improve the modulus of glass. The technical bottleneck that the modulus of S glass and R glass fiber cannot be improved with the increasing production scale is resolved. Compared with the current mainstream high-performance glasses, the glass fiber composition of the present invention has made great progress on the elastic modulus, mechanical strength, crystallization performance and the clarification of glass. Under equal conditions, the elastic modulus and mechanical strength of glass are remarkably improved, the risk of crystallization is significantly decreased, and the amount of bubbles is significantly reduced. Therefore, the whole technical solution is particularly suitable for the tank furnace production of high-strength high-modulus glass fiber having a low bubble rate.

The invention claimed is:

1. A high-performance glass fiber composition, containing the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $R_2O = Li_2O + Na_2O + K_2O$ | <2.5% |
| $K_2O$ | ≥1.1% |
| $CaO + MgO + SrO$ | 10-24% |
| $CaO$ | 2-14% |
| $MgO$ | <13% |
| $TiO_2$ | <2% |
| $Fe_2O_3$ | <1.5%. |

2. The high-performance glass fiber composition according to claim 1, wherein the content of $Li_2O$ in weight percentage is 0.1-1%.

3. The high-performance glass fiber composition according to claim 1, wherein the content of $Y_2O_3$ in weight percentage is 0.05-6%.

4. The high-performance glass fiber composition according to claim 1, wherein the content of $Y_2O_3$ in weight percentage is 0.5-5%.

5. The high-performance glass fiber composition according to claim 1, wherein the content of $La_2O_3$ in weight percentage is 0.05-2%.

6. The high-performance glass fiber composition according to claim 1, wherein the content of $Gd_2O_3$ in weight percentage is 0.05-1%.

7. The high-performance glass fiber composition according to claim 1, further containing $CeO_2$, the content of which in weight percentage is 0-1%.

8. The high-performance glass fiber composition according to claim 1, wherein the content of SrO in weight percentage is less than 2.5%.

9. The high-performance glass fiber composition according to claim 1, wherein the content of SrO in weight percentage is 0.1-2%.

10. The high-performance glass fiber composition according to claim 1, wherein the content of CaO in weight percentage is 4-11%.

11. The high-performance glass fiber composition according to claim 1, wherein the content of MgO in weight percentage is 6-12%.

12. The high-performance glass fiber composition according to claim 1, wherein the content of $SiO_2+Al_2O_3$ in weight percentage is less than 80%.

13. The high-performance glass fiber composition according to claim 1, wherein a ratio C1 in weight percentage of $K_2O$ to $R_2O$, $C1=K_2O/R_2O$, is greater than 0.44.

14. The high-performance glass fiber composition according to claim 1, wherein a ratio C2 in weight percentage of (MgO+SrO) to CaO, C2=(MgO+SrO)/CaO, is greater than 0.9.

15. The high-performance glass fiber composition according to claim 1, containing the following contents of components in weight percentage:

| | |
|---|---|
| $SiO_2$ | 52-64% |
| $Al_2O_3$ | 12-24% |
| $RE_2O_3 = Y_2O_3 + La_2O_3 + Gd_2O_3$ | 0.05-8% |
| $La_2O_3$ | 0.05-2% |
| $R_2O = Li_2O + Na_2O + K_2O$ | <2.5% |
| $K_2O$ | ≥1.1% |
| $CaO + MgO + SrO$ | 10-24% |
| $CaO$ | 2-14% |
| $MgO$ | <13% |
| $TiO_2$ | <2% |
| $Fe_2O_3$ | <1.5% | and, a ratio C1 in weight percentage of $K_2O$ to $R_2O$, C1=$K_2O/R_2O$, is greater than 0.44.

16. The high-performance glass fiber composition according to claim 1, containing the following contents of components in weight percentage:

| | |
|---|---|
| $SiO_2$ | 52-64% |
| $Al_2O_3$ | 12-24% |
| $RE_2O_3$ = $Y_2O_3$ + $La_2O_3$ + $Gd_2O_3$ | 0.05-8% |
| $R_2O$ = $Li_2O$ + $Na_2O$ + $K_2O$ | <2.5% |
| $K_2O$ | ≥1.1% |
| $Li_2O$ | 0.1-1% |
| CaO + MgO + SrO | 10-24% |
| CaO | 2-14% |
| MgO | <13% |
| SrO | <2.5% |
| $TiO_2$ | <2% |
| $Fe_2O_3$ | <1.5% | and, a ratio C1 in weight percentage of $K_2O$ to $R_2O$, C1=$K_2O/R_2O$, is greater than 0.44, and a ratio C2 in weight percentage of (MgO+SrO) to CaO, C2=(MgO+SrO)/CaO, is greater than 0.9.

17. The high-performance glass fiber composition according to claim 1, containing the following contents of components in weight percentage:

| | |
|---|---|
| $SiO_2$ | 52-64% |
| $Al_2O_3$ | 12-24% |
| $RE_2O_3$ = $Y_2O_3$ + $La_2O_3$ + $Gd_2O_3$ | 0.05-8% |
| $Y_2O_3$ | 0.05-6% |
| $R_2O$ = $Li_2O$ + $Na_2O$ + $K_2O$ | <2.5% |
| $K_2O$ | ≥1.1% |
| $Li_2O$ | 0.1-1% |
| CaO + MgO + SrO | 10-24% |
| CaO | 2-14% |
| MgO | <13% |
| SrO | <2.5% |
| $TiO_2$ | <2% |
| $Fe_2O_3$ | <1.5% | and, a ratio C1 in weight percentage of $K_2O$ to $R_2O$, C1=$K_2O/R_2O$, is greater than 0.44, and a ratio C2 in weight percentage of (MgO+SrO) to CaO, C2=(MgO+SrO)/CaO, is greater than 0.9.

18. The high-performance glass fiber composition according to claim 1, containing the following contents of components in weight percentage:

| | |
|---|---|
| $SiO_2$ | 52-64% |
| $Al_2O_3$ | 12-24% |
| $RE_2O_3$ = $Y_2O_3$ + $La_2O_3$ + $Gd_2O_3$ | 1-6% |
| $R_2O$ = $Li_2O$ + $Na_2O$ + $K_2O$ | <2.5% |
| $K_2O$ | ≥1.1% |
| $Li_2O$ | 0.1-1% |
| CaO + MgO + SrO | 10-24% |
| CaO | 4-11% |
| MgO | 6-12% |
| SrO | <2.5% |
| $TiO_2$ | <2% |
| $Fe_2O_3$ | <1.5% | and, a ratio C1 in weight percentage of $K_2O$ to $R_2O$, C1=$K_2O/R_2O$, is greater than or equal to 0.5, and a ratio C2 in weight percentage of (MgO+SrO) to CaO, C2=(MgO+SrO)/CaO, is greater than or equal to 1.

19. A glass fiber, made of the glass fiber composition according to claim 1.

20. A composite material, comprising the glass fiber according to claim 19.

* * * * *